Figures 1, 2:
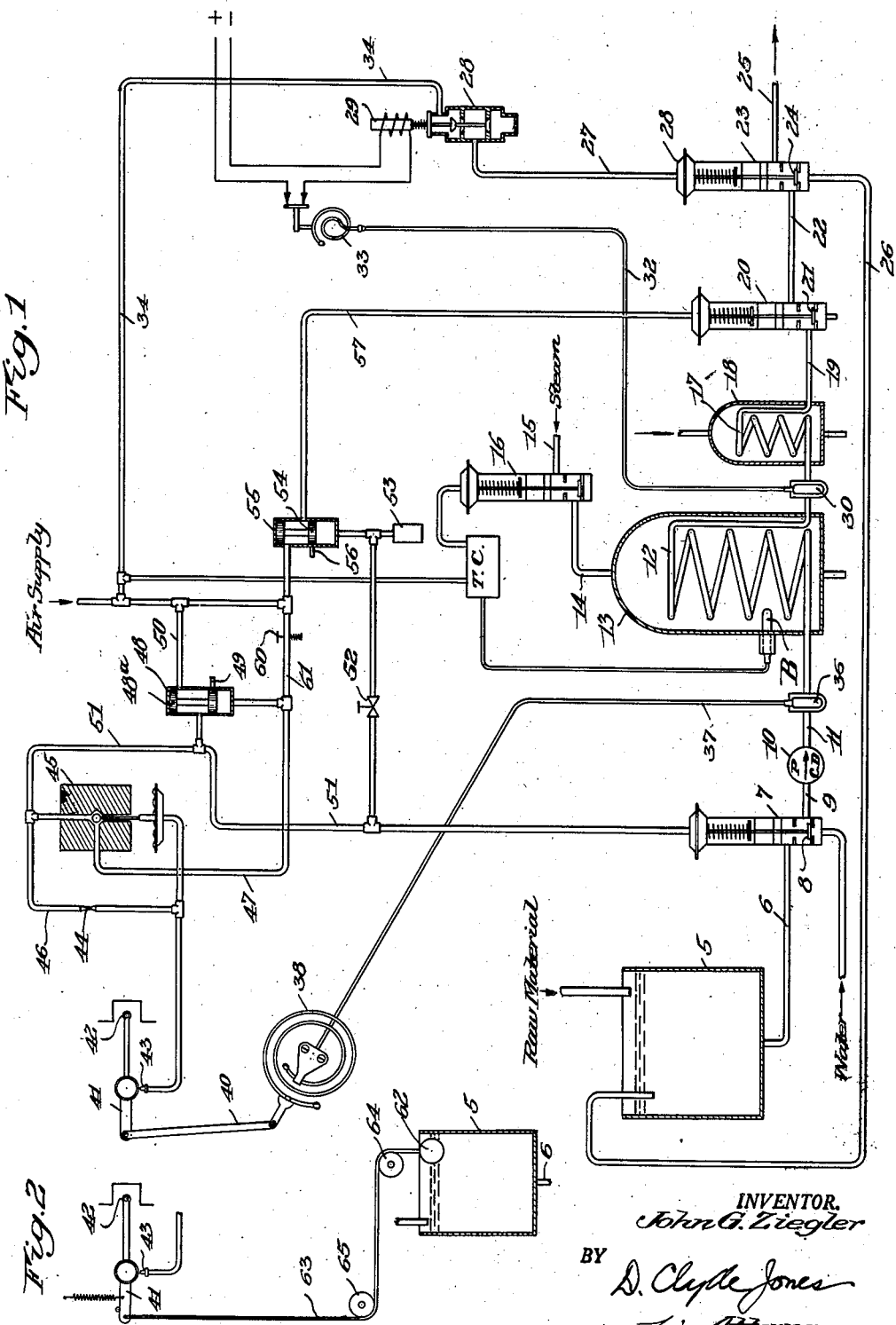

June 14, 1949.  J. G. ZIEGLER  2,472,998
METHOD AND APPARATUS FOR HEAT TREATING LIQUIDS
Filed April 18, 1946

INVENTOR.
John G. Ziegler
BY D. Clyde Jones
his Attorney

Patented June 14, 1949

2,472,998

UNITED STATES PATENT OFFICE 2,472,998

METHOD AND APPARATUS FOR HEAT-TREATING LIQUIDS

John G. Ziegler, Walnut Creek, Calif., assignor to Taylor Instrument Companies, Rochester, N. Y., a corporation of New York Application April 18, 1946, Serial No. 663,229

5 Claims. (Cl. 257—2)

1

This invention relates to the heat treating of liquids.

In the heat treating of liquids, such as in the pasteurizing of milk, tomato juice, citrus juices and the like, it has been customary to heat the liquid to a relatively low temperature and to hold it at this temperature for a specified period of time. For example, in the pasteurizing of milk, if the milk is to be pasteurized at a temperature of from 142° F. to 145° F. it must be held at this temperature for thirty minutes, whereas if the milk is pasteurized at a higher temperature of from 160° F. to 165° F., it is held for a shorter period, namely, fifteen seconds. Thus in these different heat treating or pasteurizing systems, there must be a substantial holding period which slows down the pasteurizing operation. Consequently it has been proposed to pump the liquid at high velocities through a heat exchanger of such design that relatively high (200° F. to 300° F.) temperature will be reached in a short time of the order of two seconds or less. While such a heat treating method greatly decreases the holding time as compared to present methods it is subject to the serious disadvantage that, if the supply of fluid to the heater fails, the residue of the fluid on the walls of the tubes in the heater will burn thereon. This burnt residue on the tube walls so greatly decreases the heat transfer therethrough, that the heater must be withdrawn from use for cleaning. However, the burnt residue on the tube walls is so hard that it is very difficult, if not virtually impossible, to remove.

In accordance with the present invention there is provided a method of heat-treating or pasteurizing a liquid, be it milk, citrus juice or the like, at a very high temperature for a short interval to speed up the treatment and in the event of failure of the liquid supply, water is caused to flow automatically through the tubes of the heater so that there will be no possibility of the milk or citrus juice burning thereon.

In accordance with another feature of the invention, there is provided a system in which means, responsive to pressure in the liquid supply tube to the pasteurizer or means responsive to the level of the liquid in the supply tank, shuts off the liquid supply at or prior to the failure thereof and substitutes a water supply therefor.

The various features and advantages of the invention will appear from the detailed description and claims when taken with the drawings in which Fig. 1 diagrammatically illustrates a pasteurizing system incorporating the present invention; Fig. 2 is a diagrammatic showing of

2 modified means for sensing the approaching failure of the liquid supply.

At the left of Fig. 1 there is indicated a tank 5 containing the raw liquid material, such as milk or citrus juices, to be heated. The raw liquid passes through a pipe 6 and through a three-way valve 7 with its valve disc 8 in its lower position (as shown), and through a pipe 9 to the input of a pump 10. This pump is preferably of the constant displacement, hydraulic type adapted to deliver fluid at high pressure. From the pump the raw liquid passes through the pipe 11 into the heater or pasteurizer. This pasteurizer comprises a tubular coil 12, formed of stainless steel pipe or the like enclosed in a dome-shaped tank 13, to which steam is supplied through pipe 14 from a steam source 15 under the control of a valve 16. Valve 16 is positioned by a pneumatic type of temperature controller TC having its temperature sensing bulb B in the steam in tank 13. The liquid, after being heated to the prescribed temperature in the coils 12, is passed through a cooling unit comprising a coil of pipe 17 similar to the coil 12 of the heater, coil 17 being immersed in a closed tank 18 through which cooling water flows to reduce promptly the temperature of the heated liquid. On leaving the cooler 18, the cooled liquid passes through the pipe 19 and through the valve 20 with its valve disc 21 in its lower position (as shown), so that the cooled liquid flows through the pipe 22 to the flow diversion valve 23.

This flow diversion valve maintains its valve disc 24 in its lower position as long as the liquid discharged from the heater is at the prescribed temperature, so that the liquid will be discharged from the pipe 25 into a suitable receiving vat (not shown). However, if the temperature of the liquid discharged from the heater is below the prescribed temperature the flow diversion valve 23 will be actuated to raise its valve disc 24 to its uppermost position. In this position the treated liqiud is no longer delivered to the discharge pipe 25 but instead, is diverted through the pipe 26 back to the tank 5 so that the liquid can be reprocessed to the proper temperature.

The flow diversion valve 23 has compressed air supplied through the pipe 27 to the diaphragm motor 28 of this valve to hold its valve disc 24 in its lowermost position, as long as the liquid is discharged from the heater at the required temperature. However, when the air supply is cut off from the pipe 27, the restoring spring of the valve 23 serves to raise the valve disc 24 to its upper position wherein it prevents the liquid from entering the pipe 25 but it allows it to enter pipe 26.

The control of the air supply to the pipe 27 is effected by a solenoid-operated valve 28, the solenoid 29 of which is energized by an electric contact thereometer, when the temperature of the liquid discharged from the heater is of the prescribed value. This electric contact thermometer comprises a bulb 30 immersed in the pasteurized liquid and communicating through a capillary tube 32 with a Bourdon spring 33. This spring closes the contacts in the circuit of the solenoid as long as the temperature of the treated liquid, as it flows over bulb 30, is above the specified value. With the solenoid energized, air is supplied through the pipe 34 and the solenoid valve 28, thence through the pipe 27 to the diaphragm motor 28 of the flow diversion valve. If the temperature of the discharged liquid is below the prescribed value, the Bourdon spring will tend to wind up and thereby introduce a break point in the energizing circuit of the solenoid. The spring associated with the solenoid 29 will then operate the valve 28 to shut off the air supply from the pipe 34, whereupon pipe 27 will exhaust through the escape port in the bottom of the solenoid valve. While the flow diversion arrangement just described is preferred, any other flow diversion arrangement may be substituted therefor in the system.

In accordance with the present invention, if the liquid supply fails or is about to fail, provision is made to introduce a stream of water into the coiled tube 12 of the heater so that the residue of the liquid being treated will be flushed away and therefore will not burn on the inner wall of the heater coils. In the present arrangement there is provided a pressure sensing unit, including the bulb 36 of a volumetric pressure device, such as shown in Tate Patent No. 2,037,949, granted April 21, 1936. When the liquid supply to the pump 10 fails, pressure will drop about the bulb 36 of the pressure sensitive element. This element communicates through a capillary tube 37 with a Bourdon spring 38. The bulb 36, capillary tube 37 and Bourdon spring 38, which constitute a tube system, are filled with a liquid medium. Thus, as the pressure about the bulb decreases, the Bourdon spring 38 will tend to wind up, whereas on a higher pressure at the bulb the Bourdon spring will unwind. The free end of the Bourdon spring is connected through a link 40 to one end of a baffle element 41 which is pivoted at 42. The baffle element cooperates with a nozzle 43 to which compressed air a uniform pressure is supplied through a restriction 44.

In the normal operation of the system, the pressure at the bulb 36 is such that the Bourdon spring 38 tends to unwind. This will cause the baffle 41 to recede from the nozzle 43 so that the back pressure at the nozzle will decrease with the result that the capsular chamber 44 will tend to collapse to open the relay valve 45. As this valve opens, the air supply at pipe 46 tends to be connected to the pipe 47. When the pressure in pipe 47 is thus increased, the plunger 48a in the valve 48 is raised to close the vent 49 and to connect the air supply through pipes 50 and 51 to diaphragm motor of valve 7, so that its valve disc 8 is maintained in its lower position. The compressed air in pipe 47 is applied through the needle valve 52 and to capacity tank 53. Thus, after a specified interval, determined by the characteristics of the needle valve and the capacity tank the plunger 54 of the valve 55 will rise to close vent pipe 56 and to connect the pipe 50 to the pipe 57 which leads to the diaphragm motor of valve 20. This motor holds the disc 21 of valve 20 in its lower position. Thus the valves 7 and 20 maintain their valve discs 8 and 21, respectively, in their lower position as long as normal conditions prevail.

When, however, the presssure at bulb 36 drops due to the failure of the liquid supply, the Bourdon spring 38 tends to wind up, thereby tending to move the baffle 41 toward the nozzle 43. The back pressure at the nozzle 43 increases so that the capsular chamber 44 tends to inflate and thereby tends to close the relay valve 45, thus decreasing the pressure in pipe 47. The reduced pressure in this pipe permits the plunger 48a of the valve 48 to lower and thereby interrupt the connection from pipe 50 to pipe 51. Thus compressed air is cut off from the motor of valve 7 and the compressed air in the motor of valve 7 escapes to the atmosphere through vent 49. The return spring of valve 7 raises the valve disc 8 to its upper position where it shuts off the liquid from the pipe 6 and connects the water pipe thereto, so that water is now pumped through the heater tube 12.

As the pressure in pipe 51 drops, the compressed air in tank 53 tends to leak away through needle valve 52 during a predetermined interval of time. At the close of this interval, which is just short of the time necessary for the liquid to be pumped through the coil 12 and pass through valve 20, the plunger 54 of valve 55 drops. This action of the plunger disconnects the air supply in pipe 50 from pipe 57 and connects pipe 57 to the vent 56 so that the air in the motor of valve 20 escapes. The return spring of this valve 20 raises the valve disc 21 to its upper position so that this valve connects pipe 19 (which now contains water), to the drain.

The valves 7 and 20 maintain their valve discs in the positions last described, even when the pump restores the original pressure about the bulb 36 by the pumping of water through the system. This arises from the fact that the valve 48 and 55 are locked operated until a manually operated and normally closed air valve 60 is actuated to connect to the air supply through pipe 61 to the bottom of the valve 48. This raises the plunger 48a of this valve to connect air supply pipe 50 to pipe 51 and thence to the motor top of valve 7 to restore its valve disc 8 to its lower position after the liquid supply in tank 5 has become adequate. Air in pipe 51 gradually leaks through the needle valve 52 and in due time raises the pressure in the capacity tank 53 so that the pressure under the plunger 54 of the valve 55, raises this plunger to its upper position. This reconnects the air supply through pipe 57 to the motor top of valve 20. Valve 20 thus moves its valve disc 21 to its lower position so that the pipe 19 is again connected to pipe 22 and is disconnected from the drain. Normal heat treatment or pasteurization of the liquid is now restored in the manner described.

In the modified form of the invention shown in Fig. 2, the pressure sensitive tube system including bulb 36, capillary tube 37 and the Bourdon spring 38, are omitted. Instead, the float 62 resting on the top of the liquid in the tank 5 is connected by a flexible cord 63, passing over the pulleys 64 and 65 to the right-hand end of the baffle 41. The float operates the baffle in the manner similar to that in which it was operated by the Bourdon spring 38, so that when the level of the liquid in the tank 5 reaches the critical low point, the baffle 41 will be lowered toward the nozzle. This results in actuating the valve 7, in the manner already described, to disconnect the liquid from the pipe 9 and to connect water supply 8 thereto. The remainder of the operation of the system is the same as that already described.

I claim:

1. The method of heat treating a liquid which comprises causing said liquid to flow from a given source through a heated path to heat said liquid to a predetermined temperature, delivering said heated liquid to a delivery point in response to the continued maintenance of said delivered liquid at said temperature, diverting said heated liquid back to said source in response to a drop in temperature of said heated liquid below said predetermined temperature, terminating the flow of said liquid through said path and causing a substitute fluid to flow therethrough when a predetermined minimum volume of said source is present, and delivering said substitute fluid to an alternate delivery point after it has passed through said path.

2. The method of heat treating a liquid which comprises causing said liquid to flow from a source under a given pressure through a heated path to heat said liquid to a predetermined temperature, delivering said heated liquid to a delivery point in response to the continued maintenance of said delivered liquid at said temperature, diverting said heated liquid back to said source in response to a drop in temperature of said heated liquid below said predetermined temperature, terminating the flow of said liquid through said path and causing a substitute fluid to flow therethrough when a predetermined drop in said pressure takes place, and delivering said substitute fluid to an alternate delivery point after it has passed through said path.

3. In a liquid treating system, a heater, a source of primary liquid to be treated, a source of substitute liquid, means for pumping said primary liquid from said source through the heater at a pressure in excess of a given value, means responsive to a drop in pressure of the liquid below said given value for disconnecting said primary liquid source from said pump and for supplying the substitute liquid to the pump, and manually controlled means actuated at the will of the operator for operating at least a portion of said first means for reconnecting the primary liquid source to said pump and for disconnecting substitute liquid source therefrom.

4. In a liquid treating system, a heater, a three-way valve having a primary inlet port and a secondary inlet port as well as a common outlet port, a pipe connecting said outlet port to said heater, said valve having a valve element movable to a primary position to connect said primary inlet port to said outlet port and movable to a secondary position to connect said secondary inlet port to said outlet port, a primary source of liquid connected to said primary inlet port, a source of substitute liquid connected to said secondary inlet port, and means responsive to a supply of liquid at said primary source for maintaining said valve element in its primary position and responsive to the failure of the liquid supply at said primary source for maintaining said valve element in its secondary position, whereby on the failure of said primary liquid the substitute liquid is supplied to the heater.

5. In a liquid treating system, a heater, a source of primary liquid to be treated, a source of substitute liquid, means for advancing the primary liquid through the heater, mechanism responsive to a drop in the volume of the primary liquid below a given value for disconnecting said primary liquid from the heater and for supplying the substitute liquid to the heater, said mechanism including locking means effective on operation to maintain the connection of the substitute liquid to said heater to the exclusion of the primary liquid, and manually controlled means operated at the will of the operator for releasing said locking means whereby said mechanism reconnects the primary liquid to said heater and disconnects substitute liquid therefrom when the volume of said primary liquid is restored.

JOHN G. ZIEGLER.

REFERENCES CITED

The following references are of record in the file of this patent:

UNITED STATES PATENTS

| Number | Name | Date |
| --- | --- | --- |
| 2,100,326 | Getchell | Nov. 30, 1937 |
| 2,158,809 | White | May 16, 1939 |
| 2,159,110 | Swarr | May 23, 1939 |
| 2,236,087 | Detwiler | Mar. 25, 1941 |